(No Model.)
C. SHEFFERD.
KETTLE TILTER.
No. 456,662. Patented July 28, 1891.
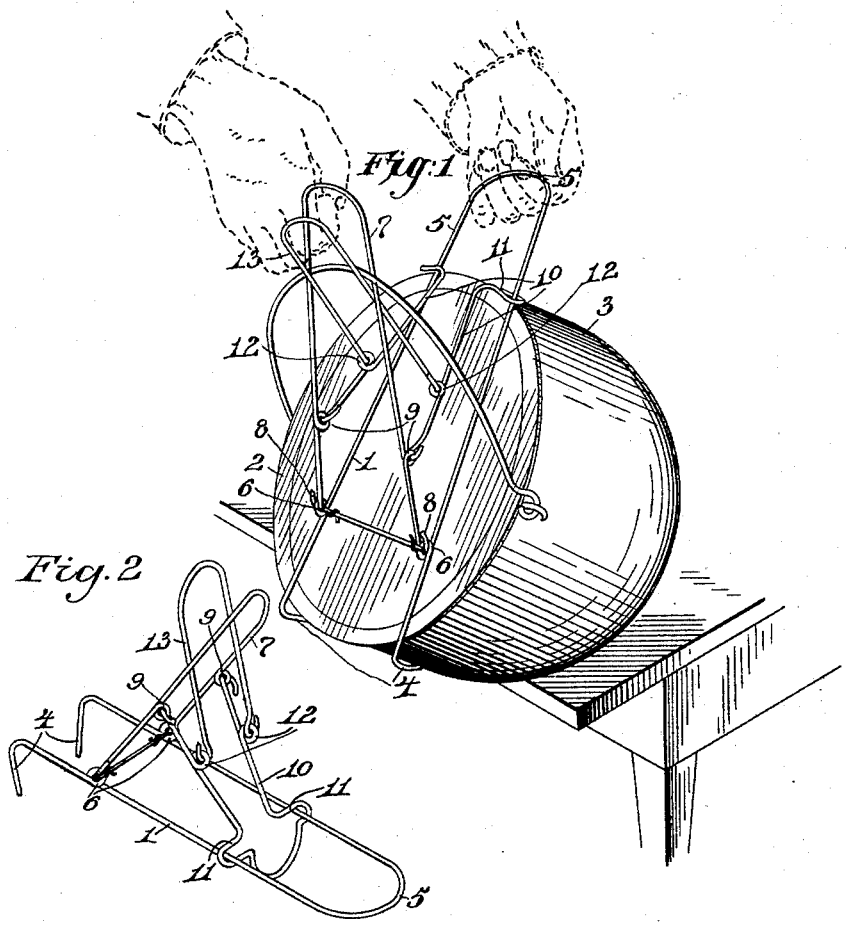
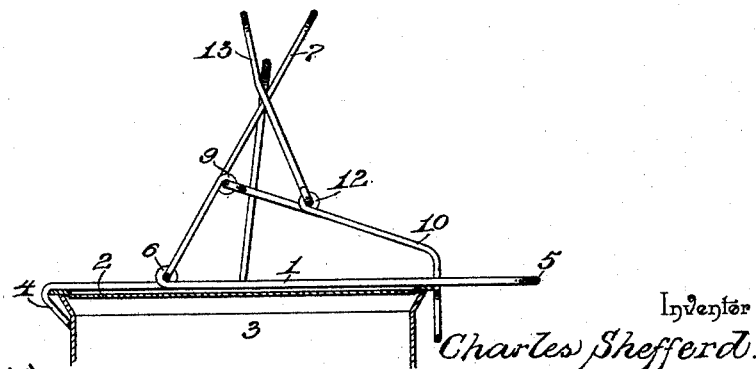
Witnesses
C. M. Gallaher
H. T. Riley
Inventor
Charles Shefferd.
By his Attorneys,
C. A. Snow & Co.

UNITED STATES PATENT OFFICE.

CHARLES SHEFFERD, OF CLEARWATER, NEBRASKA.

KETTLE-TILTER.

SPECIFICATION forming part of Letters Patent No. 456,662, dated July 28, 1891.

Application filed February 4, 1891. Serial No. 380,133. (No model.)

*To all whom it may concern:*

Be it known that I, CHARLES SHEFFERD, a citizen of the United States, residing at Clearwater, in the county of Antelope and State of Nebraska, have invented a new and useful Kettle-Tilter, of which the following is a specification—

The invention relates to improvements in devices for lifting and tilting culinary vessels.

The object of the present invention is to provide a simple and inexpensive device adapted to be readily adjusted to pots, kettles, pans, and other culinary vessels, and capable of securely holding the same and the covers thereof while transferring the vessels from one place to another and tilting them to drain their contents.

The invention consists in the construction and novel combination and arrangement of parts hereinafter fully described, illustrated in the accompanying drawings, and pointed out in the claims hereto appended.

In the drawings, Figure 1 is a perspective view of a vessel lifter and tilter embodying the invention and shown applied in operative position to a pot. Fig. 2 is a similar view of the device detached. Fig. 3 is a central longitudinal sectional view of the device as shown in Fig. 1.

Referring to the accompanying drawings, 1 designates an approximately U-shaped frame or bed constructed of stout wire or other suitable material and adapted to rest flat upon the cover 2 of a pot 3 to secure the cover thereon to enable the contents of the pot to be drained without liability of spilling the solid portion of the contents. The ends 4 of the wire are formed into hooks, which are arranged at one end of the frame, and the opposite end 5 forms a handle, and the sides of the frame are provided intermediate their ends with eyes 6, which are formed by coiling the metal, and to which is secured a lever 7, which is approximately U-shaped and is constructed of material similar to the frame 1 and has the ends 8 of the wire engaging the eyes 6, and the sides of the lever are provided with eyes 9, to which is secured one end of a sliding clamping-loop 10. The sliding loop 10 is constructed of wire and is adapted to engage the pot 3 at a point diametrically opposite the hooks 4, and its sides are provided near the end of the frame that engages the pot with grooves or recesses 11, formed by bending the wire inward and adapted to receive the frame or bed 1 to slide thereon, and the sides are provided near the opposite end of the frame with eyes 12, and the ends of the sides engage the eyes 9 of the lever 7. By forcing the lever away from the handle 5 of the frame or bed 1 the loop is caused to clamp the pot at one side of the same, and the hooks 4 clamp the pot at the opposite side and securely hold the cover in place and enable the pot to be readily drained or removed from place to place.

Attached to the eyes 12 of the sliding loop is a bail 13, which is arranged at an angle to the lever and extends through the same and facilitates the operation of the lever and aids the same in causing the sliding loop to clamp the pot.

The device is adapted to readily engage a pot, pan, or the like to move the same from one place to another and is adapted to enable a vessel to be drained without liability of any of the contents coming in contact with the hands. The lifter and tilter can also be employed to advantage in lifting dishes from water, thereby obviating the necessity of bringing the hands in contact with the water.

The frame is strengthened by a wire brace connecting its sides and having its ends secured to the eyes 6, and the said brace prevents the sides of the frame spreading during tilting.

It will be seen that the lifter and tilter is simple and inexpensive in construction and is adapted to prevent scalding and burning of the hands by contact with the pot, liquids, and vessels.

What I claim is—

1. The combination of the frame adapted to engage one side of a vessel or the like, a loop sliding on the frame and arranged to engage the opposite side of the vessel, and a lever fulcrumed on the frame and connected to the loop, substantially as and for the purpose described.

2. In a vessel tilter and lifter, the combination of the frame arranged to engage one side of the vessel, the loop sliding on the frame and arranged to engage the opposite side of the vessel, the lever fulcrumed on the frame and connected to the loop, and the bail hinged to the loop, substantially as described.

3. In a vessel tilter and lifter, the combination of the U-shaped frame provided at one end with hooks adapted to engage one side of a vessel, the lever fulcrumed on the sides of the frame, the clamping-loop provided in its sides with grooves or recesses to receive the frame and connected to the lever and adapted to engage the opposite side of the vessel, and a bail hinged to the clamping-loop, substantially as described.

4. In a vessel tilter and lifter, the combination of the U-shaped frame provided at one end with hooks to engage one side of a vessel and having its other end forming a handle and provided intermediate its ends with eyes, the loops sliding on the frame and adapted to engage the opposite side of the vessel and provided in its sides with bends forming grooves to receive the frame and having eyes 9, the lever hinged to the eyes of the frame and being approximately U-shaped and provided intermediate of its ends with eyes to receive the sliding loop, and the bail hinged to the eyes of the latter, substantially as described.

5. The frame 1, adapted to span the top of a vessel and having one end provided with hooks or catches to engage one side of the vessel, the other end being extended to provide a suitable handle, and a loop sliding on the frame and arranged to engage the other side of the vessel, substantially as described.

In testimony that I claim the foregoing as my own I have hereto affixed my signature in presence of two witnesses.

CHARLES SHEFFERD.

Witnesses:
L. SHORTT,
V. S. WALTERS.